United States Patent
Padmanabhan et al.

(10) Patent No.: US 7,216,077 B1
(45) Date of Patent: May 8, 2007

(54) LATTICE-BASED UNSUPERVISED MAXIMUM LIKELIHOOD LINEAR REGRESSION FOR SPEAKER ADAPTATION

(75) Inventors: Mukund Padmanabhan, White Plains, NY (US); George A. Saon, Putnam Valley, NY (US); Geoffrey G. Zweig, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 09/670,251

(22) Filed: Sep. 26, 2000

(51) Int. Cl.
*G10L 15/06* (2006.01)
*G10L 15/14* (2006.01)

(52) U.S. Cl. .................. 704/240; 704/244; 704/246
(58) Field of Classification Search ............... 704/236, 704/240, 243, 244, 246, 250
See application file for complete search history.

(56) References Cited

U.S. PATENT DOCUMENTS

| | | | | |
|---|---|---|---|---|
| 4,829,577 A * | 5/1989 | Kuroda et al. | ............... | 704/244 |
| 4,980,918 A * | 12/1990 | Bahl et al. | ................... | 704/240 |
| 5,271,088 A * | 12/1993 | Bahler | ........................ | 704/200 |
| 5,598,507 A * | 1/1997 | Kimber et al. | ............... | 704/246 |
| 5,625,748 A * | 4/1997 | McDonough et al. | ........ | 704/251 |
| 5,822,729 A * | 10/1998 | Glass | ........................... | 704/255 |
| 5,864,810 A * | 1/1999 | Digalakis et al. | ............. | 704/255 |
| 5,963,903 A * | 10/1999 | Hon et al. | .................... | 704/254 |
| 6,003,002 A * | 12/1999 | Netsch | ........................ | 704/236 |
| 6,038,528 A * | 3/2000 | Mammone et al. | ......... | 704/203 |
| 6,134,527 A * | 10/2000 | Meunier et al. | ............. | 704/247 |
| 6,151,574 A * | 11/2000 | Lee et al. | ..................... | 704/256 |
| 6,226,611 B1 * | 5/2001 | Neumeyer et al. | ........... | 704/246 |
| 6,272,462 B1 * | 8/2001 | Nguyen et al. | .............. | 704/244 |
| 6,389,393 B1 * | 5/2002 | Gong | ........................ | 704/244 |
| 6,411,929 B1 * | 6/2002 | Ishiwatari et al. | ........... | 704/239 |
| 6,411,930 B1 * | 6/2002 | Burges | ........................ | 704/240 |
| 6,421,641 B1 * | 7/2002 | Huang et al. | ................ | 704/250 |
| 6,542,866 B1 * | 4/2003 | Jiang et al. | .................. | 704/255 |
| 6,697,778 B1 * | 2/2004 | Kuhn et al. | .................. | 704/243 |
| 6,847,734 B2 * | 1/2005 | Hamamura | .................. | 382/229 |

OTHER PUBLICATIONS

Woodland et al., "Iterative Unsupervised Adaptation Using Maximum Likelihood Linear Regression," Fourth International Conference on Spoken Language, 1996. ICSLP 96. Proceedings. Oct. 3-6, 1996, vol. 2, pp. 1133 to 1136.*
Padmanabhan et al., "Speaker clustering and transformation for speaker adaptation in speech recognition systems," IEEE Transactions of Speech and Audio Processing, Jan. 1998, vol. 6, Issue 1, pp. 71 to 77.*

(Continued)

*Primary Examiner*—Martin Lerner
(74) *Attorney, Agent, or Firm*—Ference & Associates

(57) ABSTRACT

Methods and arrangements using lattice-based information for unsupervised speaker adaptation. By performing adaptation against a word lattice, correct models are more likely to be used in estimating a transform. Further, a particular type of lattice proposed herein enables the use of a natural confidence measure given by the posterior occupancy probability of a state, that is, the statistics of a particular state will be updated with the current frame only if the a posteriori probability of the state at that particular time is greater than a predetermined threshold.

4 Claims, 2 Drawing Sheets

OTHER PUBLICATIONS

Bahl et al., "Discriminative training of Gaussian mixture models for large vocabulary speech recognition sytems," 1996 IEEE International Conference on Acoustics, Speech, and Signal Processing, May 7-10, 1996, vol. 2, pp. 613 to 616.*

Y. Ephraim, "A Bayesian estimation approach for speech enhancement using hidden Markov models," IEEE Transactions on Signal Processing, Apr. 1992, vol. 40, Issue 4, pp. 725 to 735.*

Wikipedia, Definition of "Language Model", Mar. 1, 2006, One Page.*

Wikipedia, "Hidden Markov model", 5 Pages.*

M. Padmanabhan et al., "Lattice Based Unsupervised MLLR for Speaker Adaptation in Speech Recognition Systems", ISCA ITRW ASR2000 Paris, France, 2000.

R. Kneser et al., "Improved Backing-off for n-gram Language Modeling", Proceedings of the International Conference on Acoustics, Speech and Signal Processing, 1995.

L. Mangu et al., "Lattice Compression in the Consensual Post-Processing Framework", Proceedings of SCI/ISAS, Orlando, Florida, 1999.

T. Kemp et al., "Estimating Confidence Using Word Lattices", Proceedings of ICASSP '97 , 1997.

G. Evermann et al., "Large Vocabulary Decoding and Confidence Estimation Using Word Posterior Probabilities", Proceedings of ICASSP '00, 2000.

M. Padmanabhan et al., "Recent Improvements in Voicemail Transcription", Proceedings of EUROSPEECH '99, Budapest, Hungary, 1999.

G. Saon et al., "Maximum Likelihood Discriminant Feature Spaces", Proceecings of ICASSP '2000, Istanbul, 2000.

F. Wallhoff et al., "Frame-Discriminative and Confidence-Driven Adaptation for LVCSR", Proceedings of ICASSP'00, 2000.

C.J. Leggetter et al., "Flexible Speaker Adaptation Using Maximum Likelihood Linear Regression", Cambridge University Press.

* cited by examiner

LATTICE-BASED UNSUPERVISED MAXIMUM LIKELIHOOD LINEAR REGRESSION FOR SPEAKER ADAPTATION

FIELD OF THE INVENTION

The present invention generally relates to methods and arrangements for providing speaker adaptation in connection with speech recognition.

BACKGROUND OF THE INVENTION

Acoustic adaptation is playing an increasingly important role in speech recognition systems, to compensate for the acoustic mismatch between training and test data, and also to adapt speaker-independent systems to individual speakers. Most speech recognition systems use acoustic models that include multi-dimensional gaussians that model the probability density function (pdf) of the feature vectors for different classes. (For general background on speech recognition, including gaussian mixture pdf's, see, e.g. *Fundamentals of Speech Recognition,* Lawrence Rabiner and Biing-Hwang Juang, Prentice Hall, 1993; and *Statistical Methods for Speech Recognition,* Frederick Jelinek, The MIT Press, 1997.) A commonly used adaptation technique in this connection is maximum likelihood linear regression (MLLR), which assumes that the parameters of the gaussians are transformed by an affine transform into parameters that better match the test or adaptation data. In a simple implementation, the mean $u_i$ of each gaussian $g_i$ is transformed according to $u_i'=Au_i$ where A is the transform matrix, and $u_i$ is optionally padded with ones to represent an offset. The transform is chosen so as to maximize the probability of a collection of adaptation data with associated transcriptions. In more sophisticated implementations, the gaussian variances may also be adjusted. MLLR is further discussed, for instance, in Leggetter et al., "Speaker Adaptation of Continuous Density HMM's Using Multivariate Linear Regression", Proceedings of ICSLP '94, Yokohama, Japan, 1994. This technique is also often used in "unsupervised" mode, where the correct transcription of the adaptation data is not known, and a first pass decoding using a speaker independent system is used to produce an initial transcription.

Although MLLR appears to work fairly well even when the unsupervised transcription is mildly erroneous, it is recognized herein that further improvements are possible.

Accordingly, a need has been recognized, inter alia, in connection with improving upon the shortcomings and disadvantages associated with conventional arrangements such as those discussed above.

SUMMARY OF THE INVENTION

In accordance with at least one presently preferred embodiment of the present invention, it is presently recognized that it is possible to improve upon the performance of MLLR, even when the unsupervised transcription is mildly erroneous, by taking into account the fact that the initial transcription contains errors. This may be accomplished, for example, by considering not just the "1-best" (i.e., single best) transcription produced during the first pass decoding, but the top N candidates. (See, for example, Jelinek [1997], supra, for a description of "N-best" decoding and definitions associated therewith.) Alternatively, if the first pass decoding produces a word graph, this can be used as the reference word graph, instead of the 1-best or N-best reference transcriptions. In contrast to an N-best list, which simply enumerates a relatively small number (e.g. 100 or 1000) of likely word sequences, a word graph is a compact representation of all the word sequences that have any appreciable probability. An example of a word graph is illustrated in FIG. 2.

Broadly contemplated herein, in accordance with at least one presently preferred embodiment of the present invention, is a formulation that affinely transforms the means of the gaussians to maximize the log likelihood of the adaptation data under the assumption that a word graph is available that represents all possible word sequences that correspond to the adaptation data. The word graph is produced during a first pass decoding with speaker independent models. It is also possible to consider only those regions of the word graph that represent a high confidence of being correct to further improve the performance.

In one aspect, the present invention provides a method of providing speaker adaptation in speech recognition, the method comprising the steps of: providing at least one speech recognition model; accepting speaker data; generating a word lattice based on the speaker data; and adapting at least one of the speaker data and the at least one speech recognition model in a manner to maximize the likelihood of the speaker data with respect to the generated word lattice.

In another aspect, the present invention provides an apparatus for providing speaker adaptation in speech recognition, the apparatus comprising: at least one speech recognition model; an accepting arrangement which accepts speaker data; a lattice generator which generates a word lattice based on the speaker data; and a processing arrangement which adapts at least one of the speaker data and the at least one speech recognition model in a manner to maximize the likelihood of the speaker data with respect to the generated word lattice.

Furthermore, in another aspect, the present invention provides a program storage device readable by machine, tangibly embodying a program of instructions executable by the machine to perform method steps for providing speaker adaptation in speech recognition, the method comprising the steps of: providing at least one speech recognition model; accepting speaker data; generating a word lattice based on the speaker data; and adapting at least one of the speaker data and the at least one speech recognition model in a manner to maximize the likelihood of the speaker data with respect to the generated word lattice.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
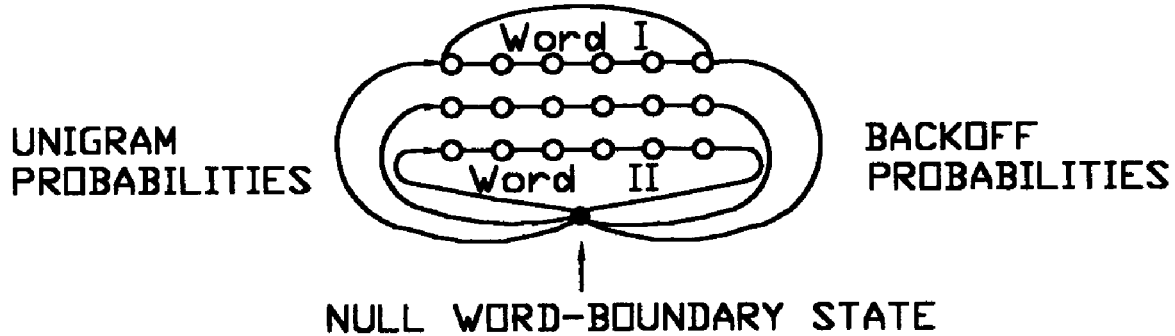
FIG. 1 illustrates a Hidden Markov Model (HMM) structure used to generate Maximum A-Posteriori Probability (MAP) lattices.

Throughout the present disclosure, various terms are utilized that are generally well-known to those of ordinary skill in the art. For a more in-depth definition of such terms, any of several sources may be relied upon, including Rabiner and Juang (1993), supra, and Jelinek (1997), supra. First, a theoretical framework is discussed in connection with at least one presently preferred embodiment of the present invention.

Also, the article "Lattice Based Unsupervised MLLR for Speaker Adaptation in Speech Recognition Systems" (Mukund Padmanabhan, George Saon, Geoffrey Zweig, ISCA ITRW ASR2000 Paris, France 2000 [http colon forwardslash forwardslash www-tlp dot limsi dot fr forwardslash asr2000]) is hereby fully incorporated by reference as if set forth in its entirety herein.

In a typical speech recognition system, the speech signal is represented as a sequence of observation vectors, and throughout the present discussion, $y_t$ denotes the multi-dimensional observation at time t, and $y_1^T$ denotes the T observations corresponding to the adaptation data. The pdf's of each context dependent phonetic state s is modeled by a single gaussian (this can be easily generalized to mixtures of gaussians) with mean and diagonal covariance $\mu s$, $\Lambda s$. $\theta$ is used to indicated the current values of the gaussian parameters, and $\hat{\theta}$ is used to denote the future (adapted) values to be estimated. The probability density of the observation $y_t$ given the pdf of state s is denoted $p_\theta(y_t/s)$. It will presently be assumed that $\theta$ and $\hat{\theta}$ are related in the following way: $\hat{u}_s = A\mu_s$, $\hat{\Lambda}_s = \Lambda s$, i.e., only the current means of the gaussians are linearly transformed, and all means are transformed by the same matrix A.

Typically, in an MLLR framework, the general objective is defined as follows: given a transcription w of the adaptation data, find $\hat{\theta}$ (or equivalently A) so that the log likelihood of the adaptation data, $y_1^T$ is maximized. The transcription w can be represented as a sequence of K states $s_1 \ldots s_K$, and the T observation frames can be aligned with this sequence of states. However, the alignment of the T frames with the sequence of states is not known. Let $s_t$ denote the state at time t. The objective is to find the maximum likelihood transform theta, and can now be written as:

$$\hat{\theta}* = \mathrm{argmax}_{\hat{\theta}} \log[p_{\hat{\theta}}(y_1^T)] \quad (1)$$
$$= \mathrm{argmax}_{\hat{\theta}} E_{s_1^T/y_1^T\theta} \log[p_{\hat{\theta}}(y_1^T)]$$
$$= \mathrm{argmax}_{\hat{\theta}} \sum_{s_1^T} p_\theta(s_1^T/y_1^T) \log[p_{\hat{\theta}}(y_1^T, s_1^T)]$$

In a lattice-based MLLR currently contemplated in accordance with at least one embodiment of the present invention, it is assumed that the word sequence, and thus the state sequence $s_1^K$, corresponding to the adaptation data cannot be uniquely identified, and this uncertainty is incorporated in the form of a lattice or word graph. Preferably, the word graph is produced by a first pass decoding with speaker independent models. The formulation of the maximum likelihood problem is essentially identical to equation (1), but with one significant difference. In (1), the states $s_t$ were assumed to belong to the alphabet of K states $s_1 \ldots s_K$, with the only allowed transitions being $s_i \to s_i$ and $s_i \to s_i+1$. In a lattice-based MLLR formulation according to at least one presently preferred embodiment of the present invention, the transition between the states is dictated by the structure of the word graph. Additionally, it is possible to take into account the language model probabilities (which are ignored in the MLLR formulation), by incorporating them into the transition probability corresponding to the transition from the final state of a word in the word graph to the initial state of the next connected word in the word graph.

The disclosure now turns to a decoding strategy for producing word graphs.

In accordance with at least one presently preferred embodiments of the present invention, a Maximum A-Posteriori Probability (MAP) word lattice is preferably generated using word internal acoustic models and a bigram language model. MAP lattices and bigram language models are discussed generally in several publications, including (Jelinek, 1997). To construct the lattice, it may be assumed that the utterance in question is produced by an HMM with a structure such as that shown in FIG. 1. Each pronunciation variant in the vocabulary appears as a linear sequence of phones in the HMM, and the structure of this model permits the use of word-internal context dependent phones. Preferably, a bigram language model is used with modified Kneser-Ney smoothing (see, for example, Kneser and Ney, "Improved Backing-off for n-gram Language Modeling", *Proceedings of the International Conference on Acoustics, Speech, and Signal Processing*, 1995). Here, there is an arc from the end of each word to a null word-boundary state, and this arc has a transition probability equal to the back-off probability for the word. From the word-boundary state, there is an arc to the beginning of each word, labeled with the unigram probability. For word pairs for which there is a direct bigram probability, an arc is preferably introduced from the end of the first word to the beginning of the second, and this arc preferably has a transition probability equal to the discounted bigram probability. Preferably, the dynamic range of the acoustic and language-model probabilities is normalized by using an appropriate language model weight, such as 15.

Preferably, the MAP lattice is constructed by computing the posterior state occupancy probabilities for each state at each time.

$$P(S_t = s \mid y_1^T) = \frac{\alpha_s^t \beta_s^t}{P(y_1^T)}$$

where $\alpha_s^t = P(y_1^t, S_t = s)$
and
$$\beta_s^t = P(y_{t+1}^T / S_t = s),$$

and then computation posterior word occupancy probabilities by summing over all the states interior to each word. That is, if $w_t$ is the set of states in word W, then the following is preferably computed at each time frame:

$$\sum_{s \in w_t} \frac{\alpha_s^t \beta_s^t}{P(y_1^T)}$$

Preferably, the N likeliest words are kept track of at each frame, and these are preferably output as a first step in the processing.

Figure 2:
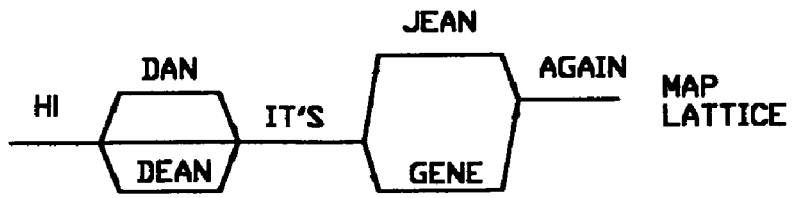
FIG. 2 illustrates word traces produced by the MAP lattice HMM, and their connection into a word lattice.

It will be noticed that a word will be on the list of "likeliest words" for a period of time, and thereafter will "fall off" that list. Thus, the output of the first step may preferably be a set of word traces, as illustrated in FIG. 2. The horizontal axis is time, while the vertical axis ranges over all the pronunciation variants.

Preferably, the next step will be to connect the word traces into a lattice. Many connection schemes are possible, but it has been found that the following strategy is quite effective. It requires that one more quantity be computed as the word traces are generated: the temporal midpoint of each trace as computed from the first moment of its posterior probability:

$$\frac{\sum_{t=start}^{t=end} tP_t(W)}{\sum_{t=start}^{t=end} t}$$

To construct an actual lattice, a connection is preferably added from the end of one word trace to the beginning of another if the two overlap, and the midpoint of the second is to the right of the midpoint of the first. This is illustrated at the bottom of FIG. 2. (It has also been found to be convenient to discard traces that do not persist for a minimum period of time, or which do not reach an absolute threshold in posterior probability).

To evaluate the lattices, the oracle worderror rate (i.e. the error rate of the single path through the lattice that has the smallest edit distance from the reference script) can be computed. This is the best worderror rate that can be achieved by any subsequent processing to extract a single path from the lattice. For voicemail transcription, the MAP lattices have an oracle word error rate of about 9%, and the ratio of the number of word occurrences in the lattices to the number of words in the reference scripts is about 64. Due to the rather lax requirements for adding links between words, the average indegree for a word is 74; that is, there are about 74 possible predecessors for each word in the graph. The MAP lattice that is produced in this way is suitable for a bigram language model: the arcs between wordends can be labeled with bigram transition probabilities, but is too large for a straightforward expansion to trigram context. In order to reduce its size, a second pass is preferably made, where the posterior probability of transitioning along the arcs that connect wordtraces is computed. That is, if $s_i$ is the last state in one word trace and $s_j$ is the first state in a successor and $a_{ij}$ is the weighted language model transition probability of seeing the two words in succession, one may compute $$P(S_t = s_i, S_{t+1} = s_j | y_1^T) = \frac{\alpha_{s_i}^t \beta_{s_j}^{t+1} a_{ij} b_j(y_{t+1})}{P(y_1^T)}$$

The above equation represents the posterior probability of being in state $s_i$ at time t and in state $s_j$ at time t+1, and transitioning between the words at an intermediate time. For each link between word traces, this quantity is summed over all time to get the total probability that the two words occurred sequentially; the links with the lowest posteriors are then discarded. It should be noted that a separate quantity is preferably computed for every link in the lattice. Thus, even if two links connect traces with the same word labels, the links will in general receive different posterior probabilities because the traces will lie in different parts of the lattice, and therefore tend to align to different segments of the acoustic data.

As in Mangu et al., "Lattice Compression in the Consensual Post-Processing Framework" (Proceedings of SCI/ISAS, Orlando, Fla., 1999), it has been found that over 95% of the links can be removed without a major loss of accuracy. Here, it was found that pruned lattices had an average indegree a little under 4, and an oracle error rate of about 11%. After pruning, lattices were expanded to a trigram context, and the posterior state occupancy probabilities needed for MLLR were computed with a modified Kneser-Ney trigram language model, along with leftword context dependent acoustic models.

Accordingly, the disclosure now turns to a discussion of a confidence-related pruning method that enables regions of low confidence to be discarded.

Word lattices have been used in a variety of confidence estimation schemes (see, for example, Kemp et. al., "Estimating Confidence Using Word Lattices" (Proceedings of ICASSP '97, 1997) and Evermann et al., "Large Vocabulary Decoding and Confidence Estimation Using Word Posterior Probabilities (Proceedings of ICASSP '00, 2000). Here, the simplest possible measure posterior phone probability was explored for discarding interpretations in which there was low confidence. It is to be recalled that, as a first step in MLLR, the posterior gaussian probabilities are computed for all the gaussians in the system. This is composed on a phone-by-phone basis, first computing the posterior phone probability, and then multiplying by the relative activations for the gaussians associated with the phone. For phone $s_i$ with gaussian mixture $G_i$, and for a specific time frame yt, $$P(G_t = g_j | y_1^T) = P(S_t = s_i | y_1^T) \frac{g_j(y_t)}{\sum_{g \in G_i} g(y_t)}$$

Since the gaussian posteriors are used to define a set of linear equations that are solved for the MLLR transform, it is reasonable to assume that noisy or uncertain estimates of the posteriors will lead to a poor estimate of the MLLR transform. To examine the truth of this hypothesis, the MLLR transform was estimated from subsets of the data, using only those estimates of $P(S_t=s_i/y_1^T)$ that were above a threshold, typically 0.7 to 0.9.

The experiments were performed on a voicemail transcription task. (For a general discussion of voicemail transcription, see Padmanabhan et al., "Recent Improvements in Voicemail Transcription" (Proceedings of EUROSPEECH '99, Budapest, Hungary, 1999)). The speaker independent system has 2313 context dependent phones, and 134,000 diagonal gaussian mixture components, and was trained on approximately 70 hours of data. The feature vectors are obtained in the following way: 24 dimensional cepstral vectors are computed every 10 ms (with a window size of 25 ms). Every 9 consecutive cepstral vectors are spliced together forming a 216 dimensional vector which is then projected down to 39 dimensions using heteroscedastic discriminant analysis and maximum likelihood linear transforms (see Saon et al., "Maximum Likelihood Discriminant Feature Spaces", to appear in Proceedings of ICASSP '2000, Istanbul, 2000).

The test set contains 86 randomly selected voicemail messages (approximately 7000 words). For every test message, a firstpass speaker independent decoding produced a MAP word lattice described in section 3. For the MLLR statistics we used phone and gaussian posteriors as described in section 4. The regression classes for MLLR were defined in the following way: first all the mixture components within a phone were bottom-up clustered using a minimum likelihood distance and next, the representatives for all the phones were clustered again until reaching one root node. The number of MLLR transforms that will be computed depends on the number of counts that particular nodes in the regression tree get. In practice, a minimum threshold of 1500 was found to be useful. For voicemail messages which are typically 10 to 50 seconds long this results in computing 13 transforms per message.

Figure 3:
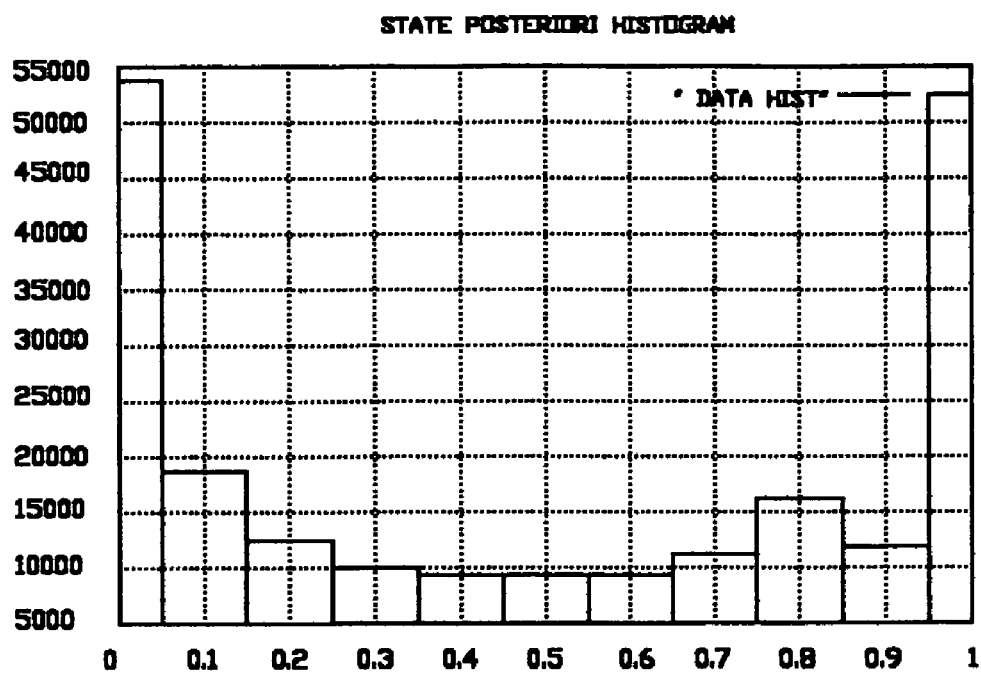
FIG. 3 illustrates a histogram of state posterior probabilities.

FIG. 3 shows the histogram of the non zero phone posteriors computed over all the test sentences. It is to be noted that, first, there are a significant number of entries with moderate (0.1–0.9) probabilities. Secondly, although there are a significant number of entries at the leftend of the histogram, they have such low probabilities that they account for an insignificant amount of probability mass. This suggests that one can use high values for the confidence thresholds on the posteriors without losing too much adaptation data.

Figure 4:
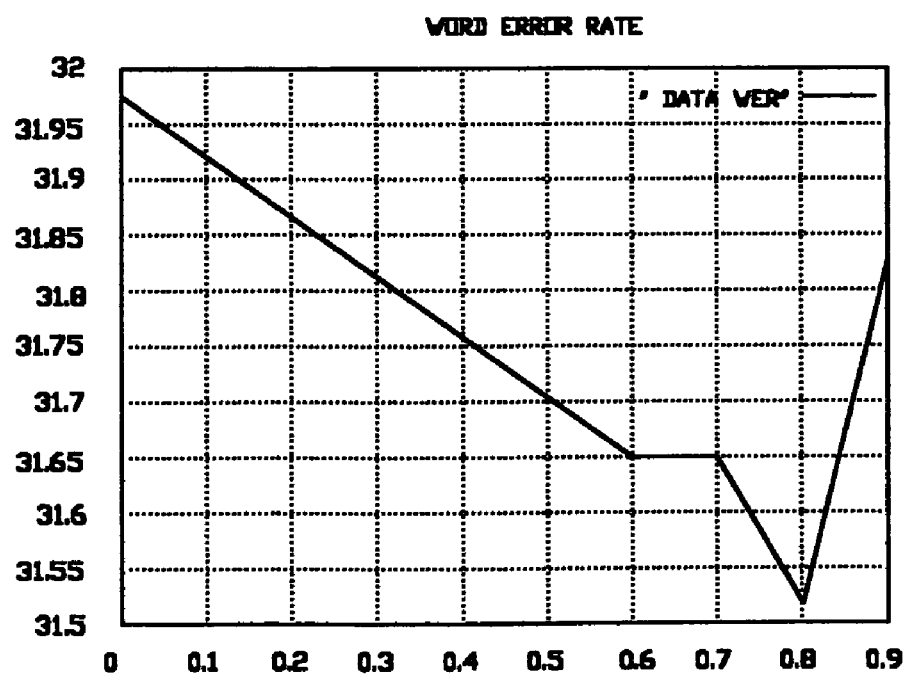
FIG. 4 illustrates a graph of word error rate versus confidence threshold.

FIG. 4 shows the word error rate as a function of the confidence threshold. The optimal results were obtained for a threshold of 0.8. Increasing the threshold above this value results in discarding too much adaptation data which counters the effect of using only alignments in which one is very confident.

Finally, Table 1 (herebelow) compares the word error rates of the speaker independent system, 1-best MLLR, lattice MLLR and confidence-based lattice MLLR. The overall improvement of the confidence-based lattice MLLR over the 1best MLLR is about 1.8% relative and has been found to be consistent across different test sets. It is expected that the application of iterative MLLR, i.e. repeated data alignment and transform estimation, will increase the improvement. This is because the lattice has more correct words to align to than the 1best transcription. For comparison, Wallhoff et. al., "Frame-Discriminative and Confidence-Driven Adaptation for LVCSR" (Proceedings of ICASSP '00, 2000) cites a gain on a "Wall Street Journal" task of 34% relative over standard MLLR by combining confidence measures with MLLR.

TABLE 1

| System | Word Error Rate |
| --- | --- |
| Baseline (SI) | 33.72% |
| 1-best MLLR | 32.14% |
| Lattice MLLR | 31.98% |
| Lattice MLLR + threshold | 31.56% |

In recapitulation, the present invention, in accordance with at least one presently preferred embodiment, broadly contemplates the use of a word lattice in conjunction with MLLR. Rather than adjusting the gaussian means to maximize the likelihood of the data given a single decoded script, a transform was generated that maximized the likelihood of the data given a set of word hypotheses concisely represented in a word lattice. It was found that the use of a lattice alone produces an improvement, and also that one can gain a more significant improvement by discarding statistics in which one has low confidence.

In further recapitulation, it will be appreciated from the foregoing that the use of lattice-based information for unsupervised speaker adaptation is explored herein. It is recognized that, as initially formulated, MLLR aims to linearly transform the means of the gaussian models in order to maximize the likelihood of the adaptation data given the correct hypothesis (supervised MLLR) or the decoded hypothesis (unsupervised MLLR). For the latter, if the first-pass decoded hypothesis is significantly erroneous (as is usually the case for large vocabulary telephony applications), MLLR will often find a transform that increases the likelihood for the incorrect models, and may even lower the likelihood of the correct hypothesis. Since the oracle word error rate of a lattice is much lower than that of the 1-best or N-best hypothesis, by performing adaptation against a word lattice, correct models are more likely to be used in estimating a transform. Further, a particular type of lattice proposed herein enables the use of a natural confidence measure given by the posterior occupancy probability of a state, that is, the statistics of a particular state will be updated with the current frame only if the a posteriori probability of the state at that particular time is greater than a predetermined threshold. Experiments performed on a voicemail speech recognition task indicate a relative 2% improvement in the word error rate of lattice MLLR over 1-best MLLR.

The present invention is applicable to all particular forms of MLLR, including those in which the gaussian variances are transformed, and those in which the feature vectors are transformed.

It is to be understood that the present invention, in accordance with at least one presently preferred embodiment, includes at least one speech recognition model, an accepting arrangement which accepts speaker data, a lattice generator which generates a word lattice based on the speaker data, and a processing arrangement which adapts at least one of the speaker data and the at least one speech recognition model in a manner to maximize the likelihood of the speaker data with respect to the generated word lattice. Together, the accepting arrangement, lattice generator and processing arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing speaker adaptation in speech recognition, said method comprising the steps of:
   providing at least one speech recognition model;
   accepting speaker data;
   generating a word lattice having a plurality of paths based on the speaker data, wherein the step of generating the word lattice comprises considering language model probabilities by incorporating the language model probabilities into a transition probability; and adapting at least one of the speaker data and the at least one speech recognition model with respect to the generated word lattice in a manner to maximize the likelihood of the speaker data, wherein said step of generating a word lattice comprises generating a maximum a-posteriori probability word lattice, wherein said step of generating a maximum a-posteriori probability word lattice comprises:
  determining posterior state occupancy probabilities for each state in the speaker data at each time;
  determining posterior word occupancy probabilities by summing over all states interior to each word in the speaker data; and
  determining at least one likeliest word at each frame of the speaker data, wherein said step of determining posterior state occupancy probabilities for each state in the speaker data at each time comprises the use of the following formula:

$$P(S_t = s \mid y_1^T) = \frac{\alpha_s^t \beta_s^t}{P(y_1^T)}$$

where $\alpha_s^t = P(y_1^t, S_t=s)$
and $\beta_s^t = P(y_{1+t}^T / S_t = s)$ for states s and a set of observations T, and where $y_t^T$ represents T observation frames of adaptation data.

2. The method according to claim 1, wherein said step of determining posterior word occupancy probabilities by summing over all states interior to each word in the speaker data comprises a determination using the following formula at each time frame:

$$\sum_{s \in w_i} \frac{\alpha_s^t \beta_s^t}{P(y_1^T)}$$

where $w_i$ is the set of states in word $W_i$.

3. An apparatus for providing speaker adaptation in speech recognition, said apparatus comprising:
  at least one speech recognition model;
  an accepting arrangement which accepts speaker data;
  a lattice generator which generates a word lattice having a plurality of paths based on the speaker data, wherein the generation of the word lattice comprises consideration of language model probabilities by incorporating the language model probabilities into a transition probability; and
  a processing arrangement which adapts at least one of the speaker data and the at least one speech recognition model with respect to the generated word lattice in a manner to maximize the likelihood of the speaker data, wherein said generator is adapted to generate a maximum a-posteriori probability word lattice, wherein said generator is adapted to:
  determine posterior state occupancy probabilities for each state in the speaker data at each time;
  determine posterior word occupancy probabilities by summing over all states interior to each word in the speaker data; and
  determine at least one likeliest word at each frame of the speaker data, wherein said determining posterior state occupancy probabilities for each state in the speaker data at each time comprises the use of the following formula:

$$P(S_t = s \mid y_1^T) = \frac{\alpha_s^t \beta_s^t}{P(y_1^T)}$$

where
  $\alpha_s^t = P(y_1^t, S_t=s)$
and
  $\beta_s^t = P(y_{t+1}^T / S_t=s)$ for states s and a set of observations T, and where $y_t^T$ represents T observation frames of adaptation data.

4. The apparatus according to claim 3, wherein said determining posterior word occupancy probabilities by summing over all states interior to each word in the speaker data comprises a determination using the following formula at each time frame:

$$\sum_{s \in w_i} \frac{\alpha_s^t \beta_s^t}{P(y_1^T)}$$

where $w_i$ is the set of states in word $W_i$.

* * * * *